US009826480B2

(12) United States Patent
Damnjanovic et al.

(10) Patent No.: US 9,826,480 B2
(45) Date of Patent: Nov. 21, 2017

(54) PAGING A USER EQUIPMENT OVER UNLICENSED SPECTRUM

(71) Applicant: QUALCOMM Incorporated, San Diego, CA (US)

(72) Inventors: Aleksandar Damnjanovic, Del Mar, CA (US); Wanshi Chen, San Diego, CA (US); Tingfang Ji, San Diego, CA (US); Naga Bhushan, San Diego, CA (US); Durga Prasad Malladi, San Diego, CA (US); Yongbin Wei, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 14/340,420

(22) Filed: Jul. 24, 2014

(65) Prior Publication Data

US 2015/0031382 A1    Jan. 29, 2015

Related U.S. Application Data

(60) Provisional application No. 61/858,947, filed on Jul. 26, 2013.

(51) Int. Cl.
*H04W 72/00*    (2009.01)
*H04W 52/02*    (2009.01)
(Continued)

(52) U.S. Cl.
CPC ..... *H04W 52/0216* (2013.01); *H04W 68/025* (2013.01); *H04W 48/12* (2013.01); *H04W 88/08* (2013.01); *Y02B 60/50* (2013.01)

(58) Field of Classification Search
CPC .............. H04W 84/027; H04W 68/02
See application file for complete search history.

(56) References Cited

U.S. PATENT DOCUMENTS

| 2008/0280631 A1* | 11/2008 | Lee | H04W 48/12 455/458 |
| 2013/0258938 A1* | 10/2013 | Sagfors | H04W 48/12 370/312 |
| 2015/0296481 A1* | 10/2015 | Yu | H04W 4/10 370/336 |

FOREIGN PATENT DOCUMENTS

| EP | 1 874 070 A1 | 1/2008 |
| WO | WO-2012/109765 A1 | 8/2012 |

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 11)", 3GPP Standard; 3GPP TS 36.304, 3rd Generation Partnership Project (3GPP), Mobile Competence Centre; 650, Route Des Lucioles; F-06921 Sophia-Antipolis Cedex; France, vol. RAN WG2, No. V11.4.0, Jul. 7, 2013 (Jul. 7, 2013), pp. 1-34, XP050712085 [retrieved on Jul. 7, 2013].

(Continued)

*Primary Examiner* — Justin Lee
(74) *Attorney, Agent, or Firm* — Arent Fox, LLP

(57) ABSTRACT

Methods and apparatus for paging comprise receiving data destined for a UE. The methods and apparatus further comprise determining a short identity for the UE relative to a longer global user equipment identity and identifying a MIB transmission based on a short identity. Moreover, the methods and apparatus comprise activating a bit within a slot of the MIB transmission to indicate that the user equipment listen for a page in order to receive the data and broadcasting the MIB. In other aspects, methods and apparatus for receiving a page comprise entering an idle state while camped on a cell. The methods and apparatus further comprise waking up from the idle state to monitor a slot of a MIB for a paging indication. Moreover, the methods and (Continued)

apparatus comprise recognizing the paging indication in the monitored slot of the MIB, determining a paging window based on correlation information in a SIB and waking up to listen for a page during the paging window.

14 Claims, 11 Drawing Sheets

(51) Int. Cl.
    *H04W 68/02*     (2009.01)
    *H04W 88/08*     (2009.01)
    *H04W 48/12*     (2009.01)

(56) References Cited

OTHER PUBLICATIONS

"3$^{rd}$ Generation Partnership Project; Technical Specification Group Radio Access Network; Evolved Universal Terrestrial Radio Access (E-UTRA); Radio Resource Control (RRC); Protocol specification (Release 11)", 3GPP Standard; 3GPP TS 36.331, 3$^{rd}$ Generation Partnership Project (3GPP), Mobile Competence Centre; 650, Route Des Lucioles; F-06921 Sophia-Antipolis Cedex; France, vol. RAN WG2, No. V11.4.0, Jul. 4, 2013 (Jul. 4, 2013), pp. 1-346, XP050712024 [retrieved on Jul. 4, 2013].
International Search Report dated Feb. 5, 2015 issued in International Patent Application No. PCT/US2014/048206. (10 total pages).

\* cited by examiner

PAGING A USER EQUIPMENT OVER UNLICENSED SPECTRUM

CLAIM OF PRIORITY

The present Application for Patent claims priority to Provisional Application No. 61/858,947 entitled "METHOD AND APPARATUS FOR PAGING A USER EQUIPMENT OVER UNLICENSED SPECTRUM" filed Jul. 26, 2013, which is assigned to the assignee hereof and hereby expressly incorporated by reference herein.

BACKGROUND

Aspects of the present disclosure relate generally to wireless communications and, more particularly, to apparatus and methods for paging a user equipment over unlicensed spectrum.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by the Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In some wireless communication networks, ineffective utilization of available communication resources, particularly resources associated with certain wireless communication technologies may prevent performance of paging procedures and lead to degradations in wireless communication. Even more, the foregoing resource underutilization may inhibit user equipments and/or wireless devices from achieving higher wireless communication quality. Thus, improvements in paging of a user equipment in some wireless communication technologies may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of paging in a wireless communication system comprises receiving data destined for a user equipment. The method further comprises determining a short identity for the user equipment relative to a longer global user equipment identity. In addition, the method comprises identifying a master information block (MIB) transmission based on the short identity. Moreover, the method comprises activating, based on the short identity, a bit within a slot of the MIB transmission to indicate that the user equipment listen for a page in order to receive the data and broadcasting the MIB.

In an additional aspect, a computer readable medium storing computer executable code for paging in a wireless communication system comprises code executable to receive data destined for a user equipment. The computer readable medium storing further comprises code executable to determine a short identity for the user equipment relative to a longer global user equipment identity. In addition, the computer readable medium storing code executable to identify a master information block (MIB) transmission based on the short identity. Moreover, the computer readable medium storing code executable to activate, based on the short identity, a bit within a slot of the MIB transmission to indicate that the user equipment listen for a page in order to receive the data and code executable to broadcast the MIB.

In another aspect, an apparatus for paging in a wireless communication system comprises means for receiving data destined for a user equipment. The apparatus further comprises means for determining a short identity for the user equipment relative to a longer global user equipment identity. In addition, the apparatus comprises means for identifying a master information block (MIB) transmission based on the short identity. Moreover, the apparatus comprises means for activating, based on the short identity, a bit within a slot of the MIB transmission to indicate that the user equipment listen for a page in order to receive the data and means for broadcasting the MIB.

In a further aspect, an apparatus for paging in a wireless communication system comprises at least one memory and an LTE-U paging component in communication with the memory and configured to receive data destined for a user equipment. The LTE-U paging component is further configured to determine a short identity for the user equipment relative to a longer global user equipment identity. In addition, the LTE-U paging component is configured to identify a master information block (MIB) transmission based on the short identity. Moreover, the LTE-U paging component is configured to activate, based on the short identity, a bit within a slot of the MIB transmission to indicate that the user equipment listen for a page in order to receive the data and broadcast the MIB.

In an aspect, a method of receiving a page in a wireless communication system comprises entering an idle state while camped on a cell. The method further comprises waking up from the idle state to monitor a slot of a master information block (MIB) for a paging indication, wherein the slot is dynamically selected and corresponds to a short identity associated with the user equipment relative to a longer global user equipment identity. In addition, the method comprises recognizing the paging indication in the monitored slot of the MIB. Moreover, the method comprises determining a paging window based on correlation information in a system information block (SIB) and waking up to listen for a page during the paging window.

In another aspect, a computer readable medium storing computer executable code for receiving a page in a wireless communication system comprises code executable to enter an idle state while camped on a cell. The computer readable medium further comprises code executable to wake up from the idle state to monitor a slot of a master information block (MIB) for a paging indication, wherein the slot is dynamically selected and corresponds to a short identity associated with the user equipment relative to a longer global user equipment identity. In addition, the computer readable medium comprises code executable to recognize the paging indication in the monitored slot. Moreover, the computer readable medium comprises code executable to determine a paging window based on correlation information in a system information block (SIB) and code executable to wake up to listen for a page during the paging window.

In a further aspect, an apparatus for receiving a page in a wireless communication system comprises means for determining to enter an idle state while camped on a cell. The apparatus further comprises means for waking up from the idle state to monitor a slot of a master information block (MIB) for a paging indication, wherein the slot is dynamically selected and corresponds to a short identity associated with the user equipment relative to a longer global user equipment identity. In addition, the apparatus comprises means for recognizing a paging indication in the monitored slot. Moreover, the apparatus comprises means for determining a paging window based on correlation information in a system information block (SIB) and means for waking up to listen for a page during the paging window.

In an additional aspect, an apparatus for receiving a page in a wireless communication system comprises an MIB wake up component configured to determine to enter an idle state while camped on a cell. The MIB wake up component further configured to wake up from the idle state to monitor a slot of a master information block (MIB) for a paging indication, wherein the slot is dynamically selected and corresponds to a short identity associated with the user equipment relative to a longer global user equipment identity. Additionally, the MIB wake up component configured to recognize a paging indication in the monitored slot. The apparatus further comprises a paging wake up component configured to determine a paging window based on correlation information in a system information block (SIB) and wake up to listen for a page during the paging window.

In an aspect, a method of paging in a wireless communication system comprises receiving data destined for a user equipment. The method further comprises identifying a slot in a master information block (MIB) that corresponds to the user equipment, wherein the slot is periodic or aperiodic. In addition, the method comprises activating a bit within the slot to indicate that the user equipment listen for a page in order to receive the data and broadcasting the MIB.

In a further aspect, a computer readable medium storing computer executable code for paging in a wireless communication system comprises code executable to receive data destined for a user equipment. The computer readable medium further comprises code executable to identify a slot in a master information block (MIB) that corresponds to the user equipment, wherein the slot is periodic or aperiodic. In addition, the computer readable medium code executable to activate a bit within the slot to indicate that the user equipment listen for a page in order to receive the data and code executable to broadcast the MIB.

In an additional aspect, an apparatus for paging in a wireless communication system comprises means for receiving data destined for a user equipment. The apparatus further comprises means for identifying a slot in a master information block (MIB) that corresponds to the user equipment, wherein the slot is periodic or aperiodic. In addition, the apparatus comprises means for activating a bit within the slot to indicate that the user equipment listen for a page in order to receive the data and means for broadcasting the MIB.

In another aspect, an apparatus for paging in a wireless communication system comprising at least one memory an LTE-U paging component in communication with the memory and configured to receive data destined for a user equipment. The LTE-U paging component further comprises identify a slot in a master information block (MIB) that corresponds to the user equipment, wherein the slot is periodic or aperiodic. Additionally, the LTE-U paging component comprises activate a bit within the slot to indicate that the user equipment listen for a page in order to receive the data and broadcast the MIB.

In an aspect, a method of receiving a page in a wireless communication system comprises entering an idle state while camped on a cell. The method further comprises waking up to monitor a slot of a master information block (MIB), wherein the slot is periodic or aperiodic and corresponds to the user equipment. Additionally, the method comprises determining a paging occasion and waking up to listen for a page during the paging occasion.

In a further aspect, a computer readable medium storing computer executable code for receiving a page in a wireless communication system comprises code executable to determine to enter an idle state while camped on a cell. The computer readable medium further comprises code executable to wake up to monitor a slot of a master information block (MIB), wherein the slot is periodic or aperiodic and corresponds to the user equipment. Additionally, the computer readable medium comprises code executable to determine a paging occasion and code executable to wake up to listen for a page during the paging occasion.

In another aspect, an apparatus for receiving a page in a wireless communication system comprises means for determining to enter an idle state while camped on a cell. The apparatus further comprises means for waking up to monitor a slot of a master information block (MIB), wherein the slot is periodic or aperiodic and corresponds to the user equipment. Additionally, the apparatus comprises means for determining a paging occasion and means for waking up to listen for a page during the paging occasion.

In an additional aspect, an apparatus for receiving a page in a wireless communication system comprising an MIB wake up component configured to determine to enter an idle state while camped on a cell and wake up to monitor a slot of a master information block (MIB), wherein the slot is periodic or aperiodic and corresponds to the user equipment. The apparatus further comprising a paging wake up component configured to determine a paging occasion and wake up to listen for a page during the paging occasion.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional components or implementations, and in which.

DETAILED DESCRIPTION

Figure 1:
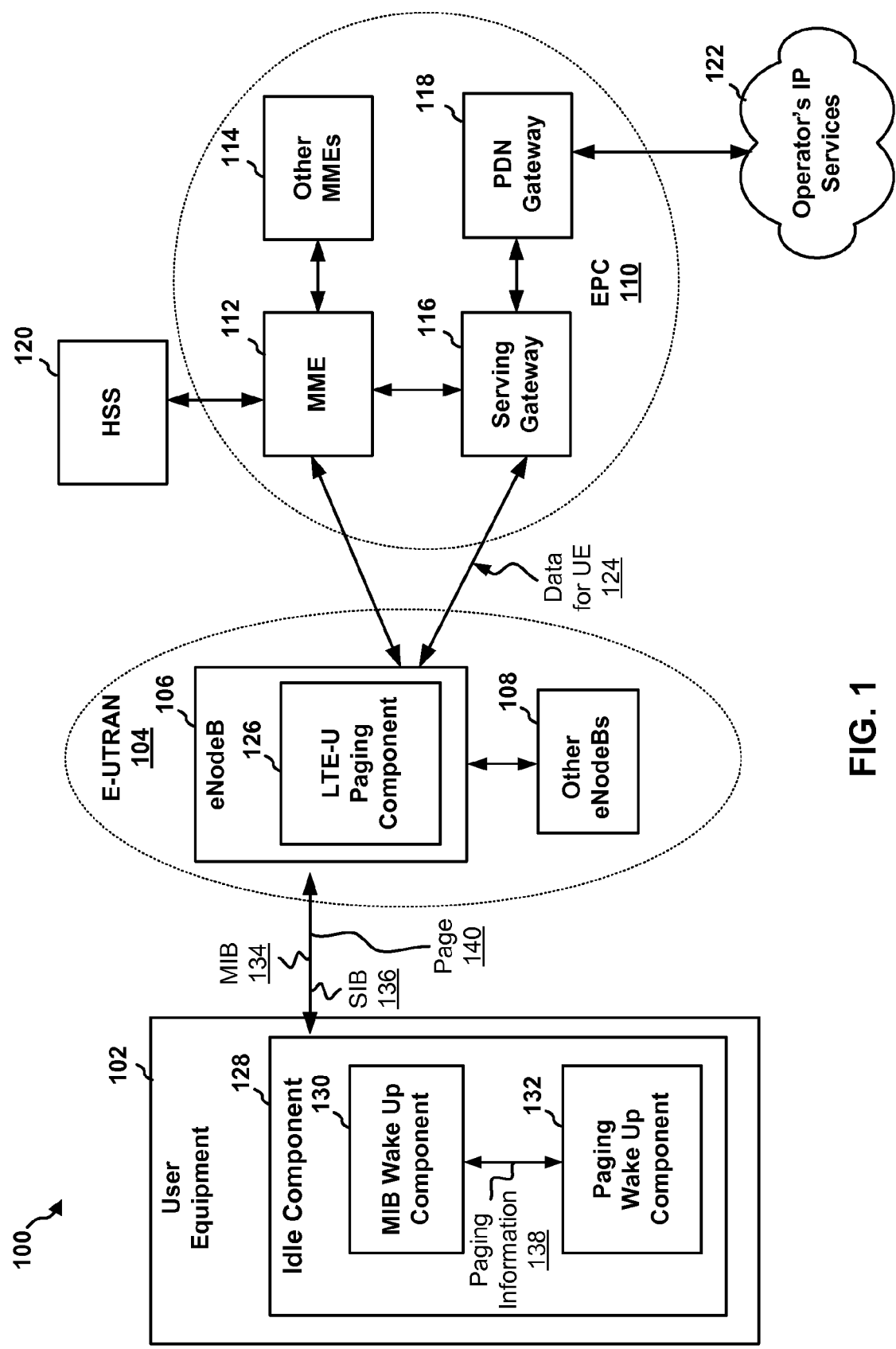
FIG. 1 is a diagram illustrating an example of a network architecture, including aspects configured to page a user equipment over unlicensed spectrum.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

In LTE, a paging procedure may be used by a network to request the establishment of a Non-Access Stratum (NAS) signaling connection between the network and a user equipment (UE). When an Internet Protocol (IP) packet (e.g., data packet) is sent to a UE from some entity or device associated with an external network, the IP packet may arrive at a Packet Data Network Gateway (PGW or P-GW). If there is not a dedicated bearer already in existence for the UE because, for example, the UE is in an idle mode, the PGW will forward the IP packet to the Serving Gateway (SGW or S-GW) on a default bearer. Once the IP packet has reached the SGW on the default bearer, the SGW may determine that there is a need to create a dedicated bearer to send the IP packet to the UE. The SGW temporarily buffers the IP packet and communicates a Downlink (DL) Data Notification message to a Mobility Management Entity (MME) in order to page the UE and create the dedicated bearers.

Further, in response to the DL Data Notification message, the MME may assist the UE in establishing a Radio Resource Control (RRC) connection, by sending a Paging Request message to all evolved Node Bs (eNodeBs or eNBs) associated with the last known Tracking Area (TA) for the UE (e.g., the eNBs located near the last known location of the UE). In response to receiving the Paging Request message, the eNBs may send a page over the radio interface to the cells that are contained within the TA, which information is provided in the Paging Request message. A UE may normally be paged using its System Architecture Evolution (SAE) Temporary Mobile Subscriber Identity (S-TMSI). The Paging Request message also may include a UE identity index value in order for the eNBs that receive the Paging Request message to calculate the paging occasions at which the UE, which may currently be in an idle state using Discontinuous Reception (DRX), will switch on its receiver to listen for paging messages.

A significant amount of unlicensed spectrum, which also may be referred to as TV white space (e.g., spectrum between television channels) or white space, is unused or lightly used. Such unlicensed spectrum may be useful for various types of wireless communications, including, for example, rural broadband deployments in difficult to reach places, providing broadband access in underserved markets, and Machine-to-Machine (M2M) communications. As such, unlicensed spectrum use may provide additional bands and significantly enhance the evolution of WiFi and other wireless access technologies in terms of both capability and functionality.

In an aspect, the use of LTE over unlicensed spectrum may be referred to as "LTE-U". In further aspects, using LTE or LTE Advanced in unlicensed spectrum, adapting LTE or LTE Advanced in unlicensed spectrum, extending LTE or LTE Advanced in unlicensed spectrum, and/or any other operating of LTE or LTE Advanced communications over unlicensed spectrum may be referred to as "LTE-U".

Although an eNB may seek to communicate with a UE according to LTE-U, the UE may not be configured to monitor or listen to a page that may arrive on unlicensed spectrum because, for example, the network has not informed the UE to do so, or the UE has a limited capability to listen for the page without wasting resources and energy (e.g., the UE cannot listen to all slots at all times over all frequencies), or the range of unlicensed spectrum is very large, and/or the like. In such aspects, the conventional LTE paging procedure, as described above, cannot be used in LTE-U applications.

According to the present aspects, enhanced mechanisms are described whereby a UE operating according to LTE may be paged over unlicensed spectrum, e.g., the UE may be paged using LTE-U. The present aspects may be helpful in ensuring that a UE can successfully determine when, and where, to listen or monitor for a page despite the unpredictability of communications according to LTE-U due to one or more of the large amount of unlicensed spectrum over which LTE may be used, UE power and resource constraints, and/or other factors.

According to a first aspect, an access point or base station (e.g., an evolved Node B, which also may be referred to as an eNodeB or eNB), may receive data destined for a UE. The data may be referenced by, or included as part of, a Paging Request Message from a mobility management entity (MME). For example, the Paging Request Message may include data or information related to a system information adjustment or change at the UE. In other words, the Paging Request Message may instruct the access point or base station to relay data to the UE for adjustment of one or more operation or communication parameters at the UE. The eNB may seek to communicate with the UE (e.g., page) using LTE over unlicensed spectrum, e.g., according to LTE-U. The UE may be associated with a short identity, which may be based on a longer, global UE identity, and may be, for example, a certain number of bits of the longer, global UE identity. The longer global UE identity may be, for example, an International Mobile Subscriber Identity (IMSI), a Temporary Mobile Subscriber Identity (TMSI), and/or a Globally Unique MME Identifier (GUMMEI).

The short identity of the UE may be known to the network (e.g., the eNB and other network components) and the UE. The eNB may determine a slot within a master information block (MIB), broadcast by the eNB, which corresponds to the UE based on, for example, the short identity of the UE. In an aspect, the MIB may be or otherwise include a block of system information which may include a number of the most frequently transmitted parameters used for a UE's initial access to the network. For example, the block of system information may include, but is not limited to, the downlink system bandwidth, an indicator of the resources allocated to Hybrid Automatic Repeat Request (HARQ) acknowledgement signaling in the downlink, and the System Frame Number (SFN). In such aspects, an SFN may identify the 10 ms radio frames of a cell of an eNodeB.

In response to receiving the data destined for the UE, the eNB may activate or set a bit in the determined slot within the MIB, which the eNB then broadcasts or signals to all UEs within a cell associated with the eNB. In such an aspect, the UE may be able to determine when to listen for, or expect the page, by determining or detecting the activated bit in the determined slot within the broadcasted MIB. Additionally, the eNB may subsequently page the UE during a paging window that occurs during a paging occasion.

In the first aspect, the UE may be configured to enter an idle state at predetermined times (e.g., periodically), upon the occurrence of certain events, and/or in response to other triggers. In such aspects, the idle state may enable the UE to reduce processing overhead relative to an active state. For example, the UE may enter idle state by relinquishing an RRC connection with the eNB. As such, the RRC connection may be indicative or correspond to the active state. While in the idle state and camped on a cell of or associated with the eNB, the UE may wake up (e.g., transition from idle state to active state) periodically to monitor a slot, e.g., the determined slot, of the MIB transmitted by the eNB. The UE may know which slot of the MIB to monitor based on the short identity of the UE and information provided by the network. In other words, the UE may determine which slot of the MIB to monitor for paging information based on the short identity. The slot may change dynamically and, as such, the UE may need to continuously, and regularly, determine (and re-determine) the slot that it should be monitoring based on, for example, its short identity.

For example, the network may provide the UE with information that correlates its short identity to a particular MIB slot. The UE may detect that a bit within the monitored MIB slot is present or activated and, as such recognize the activated bit as indicating a paging indication. Based on the paging indication, the UE may determine that data destined for the UE has been received at the eNB. In other words, the paging indication may indicate that the eNB includes data intended for the UE. Based on the paging indication, the UE may be configured to determine a paging window during which it should listen for or expect to receive its data. For example, the UE may receive information from the network, such as a system information block (SIB), that correlates the short identity of the UE with a paging window, paging channel, and/or other paging-related information.

In such aspects, the UE may receive system information by way of one or more SIBs, each of which may contain a set of functionally-related parameters. The paging window may be determined based on, for example, the system information contained within the one or more SIBs. As such, the UE may refer to such paging information to determine the paging window upon recognizing the paging indication. Thus, the UE then may wake up or transition from the idle state to the active state to listen for a page (e.g., in the form of a transmitted message) during the paging window. In some aspects, a page may be an indication informing the UE of a system information adjustment or update. In further aspects, the page may inform a UE (e.g., in idle state) of incoming connection requests (e.g., mobile terminated call).

According to a second aspect, and similar to the first aspect, an eNB may receive data destined for a UE and the eNB may seek to communicate with the UE according to LTE-U. The eNB may identify a slot, e.g., the determined slot, within an MIB broadcast by the eNB to all UEs within the cell associated with the eNB, where the slot corresponds to the UE for which the data is destined. Unlike communication over conventional LTE spectrum, the slot within an MIB associated with a particular UE during communication over unlicensed spectrum (e.g., according to LTE-U) may be aperiodic (e.g., occurring at unequal or irregular intervals) or periodic (e.g., occurring at equal or regular intervals). For example, rather than occurring once every T milliseconds (ms), the slot may occur once every fewer than T ms or once every more than T ms; however, the slot may still occur every T ms on average, where T may be a positive, numerical value. As such, the slot may be aperiodic relative or compared to a previous occurrence or identification of the slot within the range of slots in the MIB. The eNB may activate or set a bit within the MIB slot, which occurs on average every T ms, in order to indicate that the UE should listen for a page in order to receive its data. The eNB then may broadcast the MIB over the air interface according to LTE-U.

In the second aspect, and similar to the first aspect, the UE may enter an idle state while camped on a cell associated with the eNB for a variety of reasons. The UE may wake up periodically to monitor a slot, e.g., the determined slot, of the MIB transmitted by the eNB. The UE may be aware of the slot within the MIB that it should monitor based on previous information provided to the UE by the network. Such information may include system information, for example, the system frame number. In an aspect, the particular slot to be monitored may not change, despite the eNB communicating with the UE over unlicensed spectrum, but the periodicity of the slot may be dynamic and/or aperiodic (e.g., the slot will occur on average every T ms) or periodic (e.g., the slot will occur at T ms).

For example, when the UE determines that a bit within the slot is set or activated, the UE may recognize or otherwise determine the activated bit as indicating that a paging occasion, k, exists. In other words, a paging occasion may be determined based at least in part on the activated bit. For instance, a paging occasion may be a subframe where there may be a paging-radio network temporary identifier (P-RNTI) transmitted on the Physical Downlink Control Channel (PDCCH) addressing the paging message. In such aspect, the P-RNTI may be a fixed identifier used on the PDCCH to indicate paging message on the Physical Downlink Shared Channel (PDSCH). As such, a paging occasion, k, may be advertised to the UE, along with other network entities in the MIB. The paging occasion, k, may be determined based on the equation $k \times T + x(k)$, where $x(k)$ is a positive or negative pseudo-random number that is known to both the UE and the network entities (e.g., eNB). By including $x(k)$ in the equation, the UE and the network entities may account for a paging occasion k that hops, or skips, in time. Hopping paging occasions are currently configurable in LTE according to 3GPP Technical Standards TS36.304 and TS36.331 (both of which are hereby incorporated by reference in their entirety).

According to the present aspects, the value of $x(k)$ may be determined in such a way that the corresponding slot monitored by the UE may correspond to one of the subframe types suitable for paging (e.g., a non-Multicast-Broadcast Single Frequency Network (MBSFN) subframe). As such, the UE may determine the value of k based on the system frame number (SFN), which is transmitted in the MIB.

In response to recognizing and determining the paging occasion, k, the UE may wake up to listen for a page during the paging occasion k.

Although the first and second aspects are separately described herein, it may be appreciated that a UE, an eNB, and/or other components may be configured to use the first and second aspects separately, in combination with one another, and/or in combination with one another and other paging- or non-paging-related functionality.

Referring to FIG. 1, a wireless communication system 100, which may be implemented, for example, in an LTE network architecture, may include aspects related to paging of a UE over unlicensed spectrum. In an aspect, wireless communication system 100 implemented in the LTE network architecture may be referred to as an Evolved Packet System (EPS). The wireless communication system 100 may include one or more UEs, collectively referred to as UE 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a macrocell, small cell, picocell, femtocell, relay, base station, a base transceiver station, a radio base station, a radio transceiver, a transceiver function, a basic service set (BSS), an extended service set (ESS), or substantially any type of component that can communicate with UE 102 to provide wireless network access at the UE 102. The eNB 106 provides an access point to the EPC 110 for UE 102.

Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, a device for Internet-of-Things, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

In an aspect, eNB 106 may be configured to receive data 124 destined for UE 102 from the network (e.g., from SGW 116 and/or as a reference to, or as part of, a Paging Request Message from MME 112). In an aspect, eNB 106 is configured to operate according to LTE-U, rather than licensed spectrum based on, for example, load, costs, overhead, availability, and/or the like. eNB 106 may include LTE-U paging component 126, which may be configured to determine that the data 124 is destined for UE 102 based on, for example, UE identity information associated with the data 124.

UE 102 may include idle component 128, which may be configured to determine whether, and when, to enter an idle state, and whether, and when, to wake up or transition to an active state to listen for transmissions from the network, and/or other idle mode-related functionalities. The idle component 128 may include master information block (MIB) wake up component 130 and paging wake up component 132. MIB wake up component 130 may be configured to determine when to wake up UE 102 in order to listen for a MIB 134 being broadcast on the network via eNB 106. MIB wake up component 130 may be configured to read information included in the MIB 134 to determine whether, and when, the UE 102 should wake up (e.g., transition to active state and/or RRC connected state) to listen for a page 140, such information being referred to as paging information 138. Further, MIB wake up component 130 may be configured to communicate such paging information 138 to paging wake up component 132. Based on paging information 138, paging wake up component 132 may be configured to wake up UE 102 to listen for a page 140 at an appropriate time (e.g., paging window and paging occasion) and location.

According to the first aspect, and in a non-limiting example, LTE-U paging component 126 at eNB 106 may be configured to determine a short identity associated with UE 102. The short identity may be based on a longer, global UE identity and may be configured by the network when UE 102 initially registers with the network. In some aspects, multiple UEs may share the same short identity. In an aspect, the short identity for UE 102 may include two parts: one part of length M, and one part of length N. Part one of length M may be referred to as short_UE_ID_high and part two of length N may be referred to as short_UE_ID_low. LTE-U paging component 126 may be configured to identify a slot that corresponds to the short identity in a master information block (MIB) 134, which eNB 106 broadcasts to all UEs within its cell.

The slot in the MIB 134 may be determined and/or selected based on, for example, the M most significant bits of the short identity (e.g., short_UE_ID_high). As such, the MIB 134 may include N minus M (e.g., N-M) least significant bits of the short identity (e.g., short_UE_ID_low). The value of M may be as low as 0, in which case UE 102 monitors every instance when the MIB 134 is transmitted by eNB 106, and as high as N, in which case there is nothing transmitted in the MIB 134 that relates to paging of UE 102. In the latter case, all UEs that are scheduled to monitor a particular MIB (e.g., MIB 134), instead monitor for a transmission window configured by the SIB 136. N may have any positive, numerical value, but may be within the range of, in a non-limiting example, 8 to 16.

In an aspect, the network, via eNB 106, may transmit multiple short_UE_ID_low values included in MIB 134. As such, each short_UE_ID_low may correspond to a position in a bitmap referred to as short_UE_ID_low_bitmap. The length of such a bitmap would be equal to $2^{(N-M)}$. In the aspect, the network pages a particular group of UEs (including, e.g., UE 102) by turning on the corresponding bit in the bitmap. The network may configure such mapping (through, e.g., system information) between a short_UE_ID_low and a corresponding transmission window that the UE 102 may monitor for paging.

Further, in LTE (and LTE-U), MIB 134 is broadcast by eNB 106 and/or other eNBs 108, on the Physical Broadcast Channel (PBCH), which occupies the middle six Resource Blocks (RBs) of the downlink (DL) channel bandwidth, specifically the first four symbols of slot 1, subframe 0 of every radio frame sent by eNB 106. UE 102 may read the MIB 134 to acquire channel bandwidth information, a transmit antenna scheme of the broadcasting eNB, Physical Hybrid ARQ Indication Channel (PHICH) configuration, and a System Frame Number (SFN). The SFN is used as a timing reference between the eNB 106 and UE 102 for operations such as system information block (SIB) scheduling and paging. As such, the SFN is especially important in LTE-U as the network cannot expect the UE 102 to listen to all slots at all times over the entirety of the unlicensed spectrum. As such, the information included in MIB 134 allows the UE 102 to receive a page 140 in LTE-U.

In LTE-U, the UE 102 may not be assigned a static slot within MIB 134 to which it is always tuned to listen. Rather, the slot in the MIB 134 associated with UE 102 in LTE-U may be dynamically selected by the network. LTE-U paging component 126 may be configured to set or activate (e.g., turn on) a bit within the slot to indicate that UE 102 should listen for a page 140 in order to receive data 124. The eNB 106 then may broadcast the MIB 134 at least to UE 102. The eNB 106 also may broadcast one or more SIBs 136 to UE 102. According to the present aspects, one of the SIBs 136 may include information correlating the short identity to a paging window when UE 102 can expect to receive a page 140 on a paging channel.

Still according to the first aspect, idle component 128 may be configured to determine to enter an idle state while camped on a cell associated with eNB 106. MIB wake up component 130 may be configured to wake up UE 102 to monitor a slot of MIB 134 for a paging indication. Again, as described herein, the slot may be dynamically selected and corresponds to the short identity associated with UE 102. More particularly, the slot may be selected and/or determined based on the N most significant bits of the short identity. As such, by knowing its short identity, the UE 102 may identify the slot within the MIB 134 to which it should be listening.

MIB wake up component 130 may be configured to recognize or determine a paging indication, e.g., that a bit included within the monitored slot has been set or activated (e.g., turned on) by eNB 106 in order to indicate that the UE 102 should listen for a page 140. MIB wake up component 130 may be configured to communicate the paging indication as paging information 138 to paging wake up component 132. Paging wake up component 132, in response to receiving paging information 138 from MIB wake up component 130, may be configured to determine a paging window based on information in SIB 136. As described herein, SIB 136 includes information that correlates the UE 102 short identity to a particular paging window to which the UE 102 should listen to receive a page 140 when the UE 102 has recognized a paging indication. Based on the determination of the paging window, paging wake up component 132 may be configured to wake up UE 102 to listen for a page 140 during the paging window. As such, the activated bit may act to trigger the UE 102 to wake up or transition to the active state in order to listen for a page during a paging window.

According to the second aspect, and in a non-limiting example, once eNB 106 receives data 124 destined for UE 102, LTE-U paging component 126 may be configured to identify a slot in MIB 134 that corresponds to the UE 102. In an aspect, the MIB slot may be previously configured and known to both UE 102 and eNB 106. Because eNB 106 seeks to communicate with UE 102 over unlicensed spectrum, the slot within MIB 134 that corresponds to the UE may be periodic or aperiodic.

For example, rather than occurring every T milliseconds (ms) where T is a positive number, the slot may move to less than once every T ms or more than once every T ms; however, on average, the slot still occurs every T ms. As such, a paging occasion k, e.g., when the UE 102 should listen to receive a page 140, may be advertised to the UE 102, and other network entities, in MIB 134. The paging occasion k may be determined based on the equation k×T+ x(k), where x(k) may be a pseudo-random number that may be known to both the UE 102 and network entities (e.g., eNB 106). LTE-U paging component 126 may be configured to activate or set a bit within the periodic or aperiodic slot of MIB 134 to indicate that UE 102 should listen for a page 140 in order to receive the data, and then broadcast MIB 134 to the network.

Still according to the second aspect, once UE 102 determines to enter an idle state while camped on a cell associated with eNB 106, MIB wake up component 130 may be configured to wake up UE 102 to monitor the periodic or aperiodic slot within the MIB. Again, and as described herein, the MIB slot may be previously configured and known to both UE 102 and eNB 106. If a bit in the periodic or aperiodic slot is set or activated (e.g., turned on), MIB wake up component 130 may be configured to determine that the UE 102 should listen for a page 140 during a paging occasion k. MIB wake up component 130 may be configured to communicate this information (e.g., paging occasion k) to paging wake up component 132 as paging information 138. As such, paging wake up component 132 may be configured to wake up UE 102 to listen for a page 140 during the paging occasion k.

Figure 2:
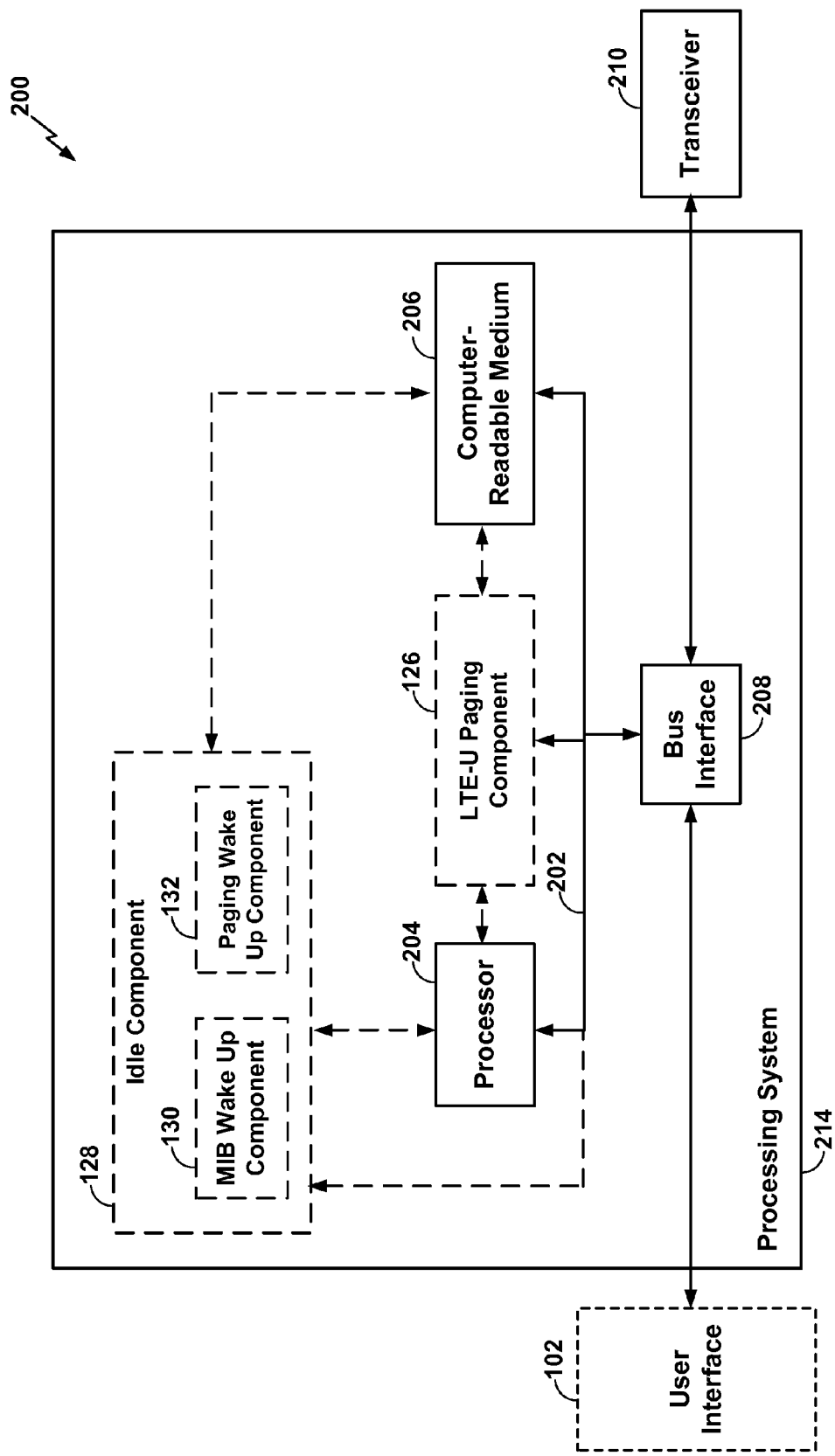
FIG. 2 is a diagram illustrating an example of a hardware implementation for an apparatus employing a processing system that includes aspects configured to page a user equipment over unlicensed spectrum in accordance with an aspect of the present disclosure, e.g., according to FIG. 1.

Referring to FIG. 2, an example of a hardware implementation for an apparatus 200 employing a processing system 214 that includes aspects for paging a UE over unlicensed spectrum. For instance, in an optional implementation (as illustrated by dashed lines) for receiving a page in a wireless communication system, apparatus 200 may include idle component 128, MIB wake up component 130, and paging wake up component 132 as described in this disclosure. Further, for instance, in an optional implementation (as illustrated by dashed lines) for paging a UE in a wireless communication system, apparatus 200 may include LTE-U paging component 126, as described in this disclosure. In an aspect, idle component 128, MIB wake up component 130, and paging wake up component 132, or LTE-U paging component 126, may be implemented as hardware, computer executable code, or some combination of both, and these components may be separate components within processing system 214 or components integrated within processor 204 and/or computer-readable medium 206 (as illustrated by dashed lines). For instance, in an aspect, idle component 128, MIB wake up component 130, and paging wake up component 132, or LTE-U paging component 126, may be implemented as processor modules in processor 204, or as computer executable code defined by computer-readable medium 206 and executable by processor 204, or in some combination of both.

In this example, the processing system 214 may be implemented with a bus architecture, represented generally by the bus 202. The bus 202 may include any number of interconnecting buses and bridges depending on the specific application of the processing system 214 and the overall design constraints. The bus 202 links together various circuits including one or more processors, represented generally by the processor 204, and computer-readable media, represented generally by the computer-readable medium 206. The bus 202 also may link various other circuits such as timing sources, peripherals, voltage regulators, and power management circuits, which are well known in the art, and therefore, will not be described any further. According to the present aspects, the bus 202 also may link idle component 128 of UE 102, including MIB wake up component 130 and paging wake up component 132, and LTE-U paging component 126 of eNB 106, all of FIG. 1.

A bus interface 208 provides an interface between the bus 202 and a transceiver 210. The transceiver 210 provides a means for communicating with various other apparatus over a transmission medium. Depending upon the nature of the apparatus, a user interface 212 (e.g., keypad, display, speaker, microphone, joystick) may also be provided.

The processor 204 is responsible for managing the bus 202 and general processing, including the execution of software stored on the computer-readable medium 206. The software, when executed by the processor 204, causes the processing system 214 to perform the various functions described herein including, for example, receiving a page over unlicensed spectrum at a UE, or paging a UE over unlicensed spectrum, according to the first and second aspects described herein, for any particular apparatus. The computer-readable medium 206 may also be used for storing data that is manipulated by the processor 204 when executing software.

Referring to FIGS. 3-6, the methods are shown and described as a series of acts for purposes of simplicity of explanation. However, it is to be understood and appreciated that the methods (and further methods related thereto) are not limited by the order of acts, as some acts may, in accordance with one or more aspects, occur in different orders and/or concurrently with other acts from that shown and described herein. For example, it is to be appreciated that the methods may alternatively be represented as a series of interrelated states or events, such as in a state diagram. Moreover, not all illustrated acts may be required to implement a method in accordance with one or more features described herein.

Figure 3:
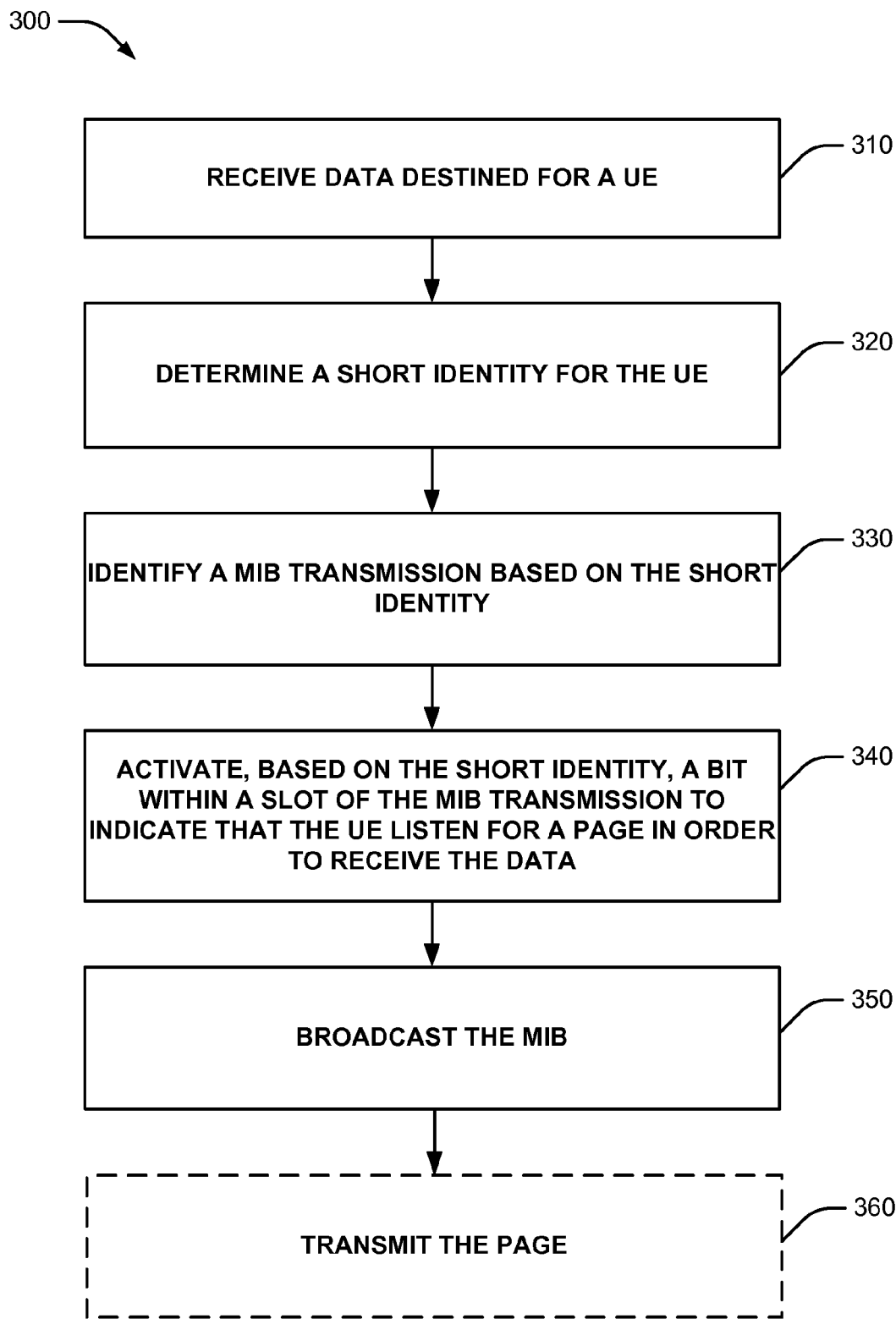
FIG. 3 is a flow chart of a method for paging a UE over unlicensed spectrum according to a first aspect, e.g., according to FIG. 1.

Referring to FIG. 3, aspects of a method 300 of paging a user equipment (e.g., UE 102, FIG. 1) in a wireless communication system, according to the first aspect, may be performed by a base station (e.g., eNB 106 and/or LTE-U paging component 126 of FIG. 1).

In an aspect, at block 310, method 300 may receive data destined for a user equipment. For example, as described herein, eNB 106 (FIG. 1) and/or LTE-U paging component 126 (FIG. 1) may receive data 124 (FIG. 1) destined for UE 102 (FIG. 1).

At block 320, method 300 may determine a short identity for the user equipment. For example, as described herein, eNB 106 (FIG. 1) and/or LTE-U paging component 126 (FIG. 1) may determine a short identity for UE 102 (FIG. 1) based on, for example, a longer, global UE identity. In some aspects, the short identity may be based on, or may be, the M most significant bits of the longer, global UE identity associated with UE 102 (FIG. 1).

At block 330, method 300 may identify a MIB transmission based on the short identity. For example, as described herein, eNB 106 (FIG. 1) and/or LTE-U paging component 126 (FIG. 1) may be configured to identify a MIB transmission (e.g., MIB 134) based on the short identity of UE 102 (FIG. 1). In some aspects, the MIB slot may be identified in the MIB transmission such that the slot is dynamically selected because, for example, eNB 106 (FIG. 1) may be communicating with UE 102 (FIG. 1) over unlicensed spectrum. In an aspect, the slot in the MIB may be determined and/or selected based on the N most significant bits of the short identity. Additionally, the MIB transmission may be identified based on a first part of the short identity of UE 102 (FIG. 1).

At block 340, method 300 may activate, based on the short identity, a bit within a slot of the MIB transmission to indicate that the user equipment listen for a page in order to receive the data. For example, as described herein, eNB 106 (FIG. 1) and/or LTE-U paging component 126 (FIG. 1) may be configured to activate (e.g., turn on), based on the short identity, a bit within a slot of the MIB transmission to indicate that UE 102 (FIG. 1) listen for page 140 (FIG. 1) in order to receive the data 124 (FIG. 1) destined for UE 102 (FIG. 1). In addition, the bit within the slot of the MIB transmission may be activated based on a second part of the short identity to indicate that UE 102 (FIG. 1) listen for page 140 (FIG. 1).

At block 350, method 300 may broadcast the MIB. For example, as described herein, eNB 106 (FIG. 1) and/or LTE-U paging component 126 (FIG. 1) may be configured to broadcast MIB 134 (FIG. 1) to all UEs within a cell associated with eNB 106 (FIG. 1). In an aspect, MIB 134 (FIG. 1) may include N minus M (e.g., N-M) least significant bits of the short identity of UE 102 (FIG. 1).

At block 360, method 300 may transmit the page. For example, as described herein, eNB 106 (FIG. 1) and/or LTE-U paging component 126 (FIG. 1) may transmit or broadcast the page for the user equipment during a paging occasion. In an aspect, the paging occasion may be determined by the user equipment and network entities in communication with the user equipment based on system frame information included in the MIB. In other aspects, the paging occasion k may occur based on k times T plus a pseudo random number known to the user equipment and network entities in communication with the user equipment.

Optionally, and in an aspect (not shown), method 300 may also broadcast one or more SIBs 136 (FIG. 1) that include information correlating the short identity of the UE 102 (FIG. 1) to a paging window when the UE 102 (FIG. 1) can expect to receive, and should listen for, a page 140 (FIG. 1) on a paging channel. For example, as described herein, eNB 106 (FIG. 1) and/or LTE-U paging component 126 (FIG. 1) may be configured to broadcast the SIB that includes the correlation between the short identity and the paging window indicating when the UE can expect to receive the page on the paging channel.

Figure 4:
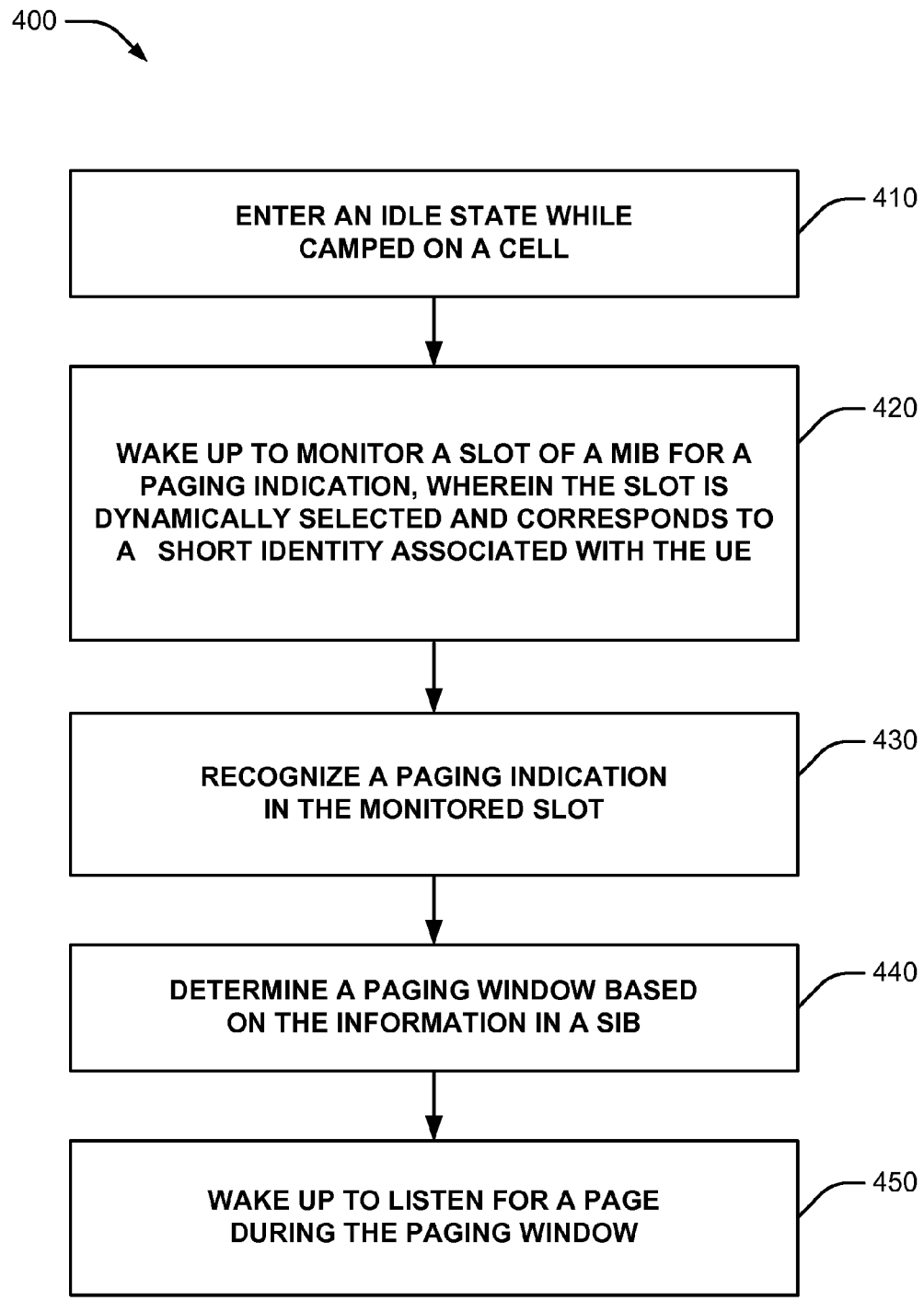
FIG. 4 is a flow chart of a method for receiving a page over unlicensed spectrum according to the first aspect, e.g., according to FIG. 1.

Referring to FIG. 4, aspects of a method 400 of receiving a page in a wireless communication system, such as page 140 (FIG. 1) from eNB 106 (FIG. 1), according to the first aspect, may be performed by UE 102 (FIG. 1). More particularly, aspects of the method 400 (FIG. 1) may be performed by idle component 128 (FIG. 1), MIB wake up component 130 (FIG. 1), and/or paging wake up component 132 (FIG. 1).

In an aspect, at block 410, method 400 may enter an idle state while camped on a cell. For example, as described herein, UE 102 (FIG. 1) and/or idle component 128 (FIG. 1) may be configured to enter UE 102 into an idle state while camped on a cell associated with eNB 106 (FIG. 1).

At block 420, the method 400 may wake up to monitor a slot of a MIB for a paging indication, wherein the slot is dynamically selected and corresponds to a short identity associated with the UE. For example, as described herein, UE 102 (FIG. 1) and/or MIB wake up component 130 (FIG. 1) may be configured to wake up UE 102 (FIG. 1) to monitor a slot of MIB 134 (FIG. 1) for a paging indication, which may be an activated (e.g., turned on) bit within the slot. The slot may be dynamically selected by the network (e.g., at eNB 106 by LTE-U paging component 126, FIG. 1) and may correspond to a short identity associated with UE 102 (FIG. 1). The short identity may be based on, or may be, the M most significant bits of a longer, global UE identity associated with UE 102 (FIG. 1). MIB wake up component 130 (FIG. 1) may be configured to monitor the slot of the MIB 134 (FIG. 1) based on the N most significant bits of the short identity.

At block 430, method 400 may recognize a paging indication in the monitored slot. For example, as described herein, UE 102 (FIG. 1) and/or MIB wake up component 130 (FIG. 1) may be configured to recognize that a bit in the slot is activated and, as such, recognize the activated bit as a paging indication. MIB wake up component 130 (FIG. 1) may communicate the paging indication, as paging information 138 (FIG. 1), to paging wake up component 132 (FIG. 1).

At block 440, method 400 (FIG. 1) may determine a paging window based on information in a SIB. For example, as described herein, in response to receiving paging information 138 (FIG. 1), which includes the paging indication, UE 102 (FIG. 1) and/or paging wake up component 132 (FIG. 1) may be configured to read SIB 136 (FIG. 1) to determine a paging window associated with the short identity of UE 102 (FIG. 1).

At block 450, method 400 may wake up to listen for a page during the paging window. For example, as described herein, UE 102 and/or paging wake up component 132 (FIG. 1) may be configured to wake up UE 102 (FIG. 1) to listen for a page 140 during the determined paging window.

Figure 5:
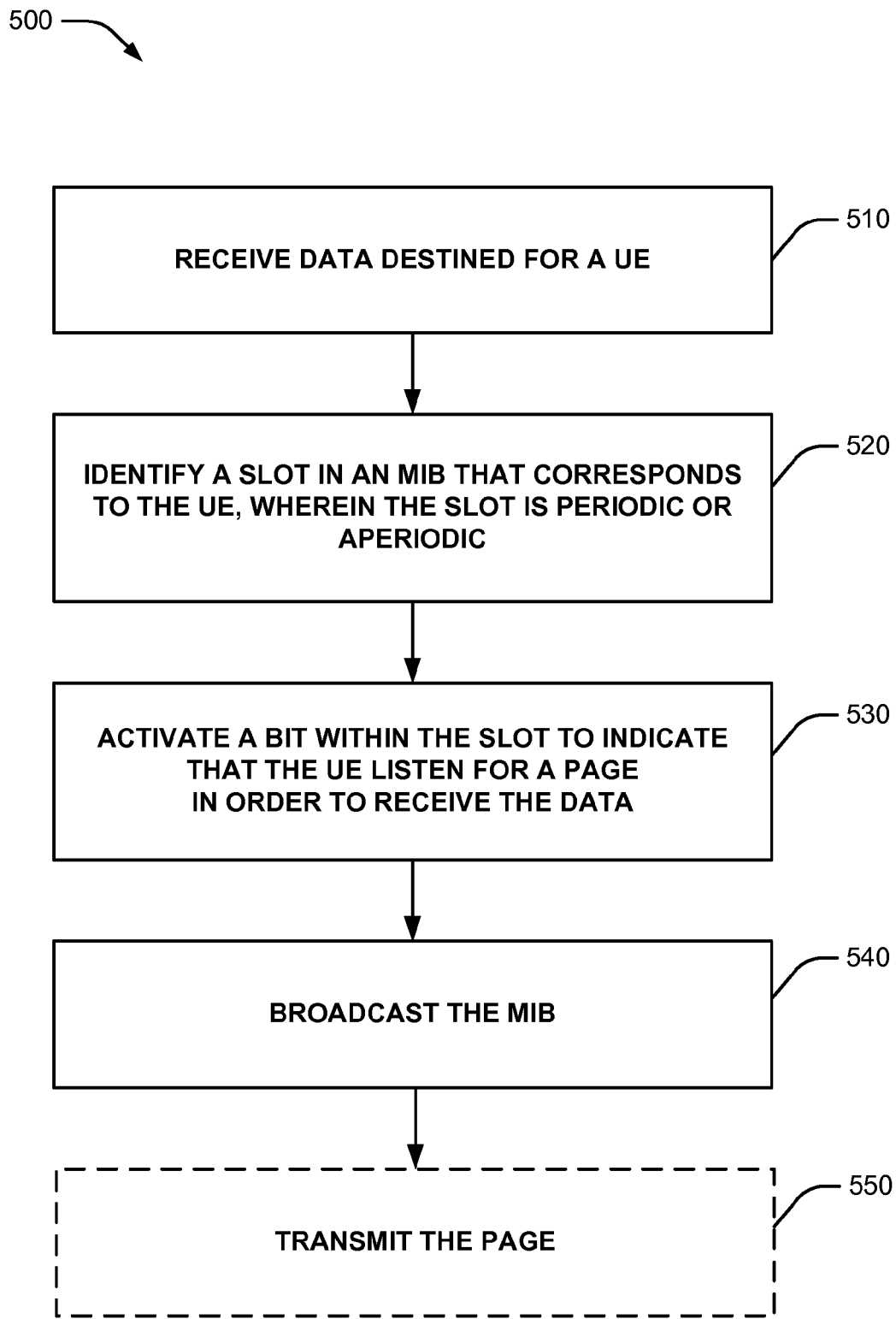
FIG. 5 is a flow chart of a method for paging a UE over unlicensed spectrum according to a second aspect, e.g., according to FIG. 1.

Referring to FIG. 5, aspects of a method 500 of paging a UE (e.g., UE 102 (FIG. 1)) in a wireless communication system, according to the second aspect may be performed by eNB 106 (FIG. 1) and/or LTE-U paging component 126 (FIG. 1).

In an aspect, at block 510, method 500 may receive data destined for a user equipment. For example, as described herein, eNB 106 (FIG. 1) and/or LTE-U paging component 126 (FIG. 1) may receive data 124 (FIG. 1) destined for UE 102 (FIG. 1).

At block 520, method 500 may identify a slot in a MIB that corresponds to the UE, wherein the slot is periodic or aperiodic. For example, as described herein, eNB 106 (FIG. 1) and/or LTE-U paging component 126 (FIG. 1) may identify a slot in MIB 134 (FIG. 1) that corresponds to the UE 102 (FIG. 1). In an aspect, the MIB slot may be previously configured and known to both UE 102 (FIG. 1) and eNB 106 (FIG. 1). Because eNB 106 (FIG. 1) seeks to communicate with UE 102 (FIG. 1) over unlicensed spectrum, the slot within MIB 134 (FIG. 1) that corresponds to the UE may be periodic or aperiodic. For example, rather than occurring every T milliseconds (ms), as in the case of periodic, the slot may move to less than once every T ms or more than once every T ms; however, on average, the slot still occurs every T ms. As such, a paging occasion k, e.g., when the UE 102 (FIG. 1) should listen to receive a page 140 (FIG. 1), may be advertised to the UE 102 (FIG. 1), and other network entities in MIB 134 (FIG. 1). The paging occasion k may be determined based on the equation k×T+x(k), where x(k) is a pseudo-random number that is known to both the UE 102 (FIG. 1) and the network entities (e.g., eNB 106).

At block 530, method 500 may activate a bit within the slot to indicate that the user equipment should listen for a page 140 (FIG. 1) in order to receive the data. For example, as described herein, eNB 106 (FIG. 1) and/or LTE-U paging component 126 (FIG. 1) may activate (e.g., turn on) a bit within the slot to indicate to UE 102 (FIG. 1) that it should listen for a page 140 in order to receive the data 124 (FIG. 1).

At block 540, method 500 may broadcast the MIB. For example, as described herein, eNB 106 (FIG. 1) and/or LTE-U paging component 126 (FIG. 1) may broadcast the MIB 134 (FIG. 1) to all UEs within a cell associated with eNB 106 (FIG. 1).

At block 550, method 500 may transmit the page. For example, as described herein, eNB 106 (FIG. 1) and/or LTE-U paging component 126 (FIG. 1) may transmit or broadcast the page for the user equipment during a paging occasion. In an aspect, the paging occasion may be determined by the user equipment and network entities in communication with the user equipment based on system frame information included in the MIB. In other aspects, the paging occasion k may occur based on k times T plus a pseudo random number known to the user equipment and network entities in communication with the user equipment.

Figure 6:
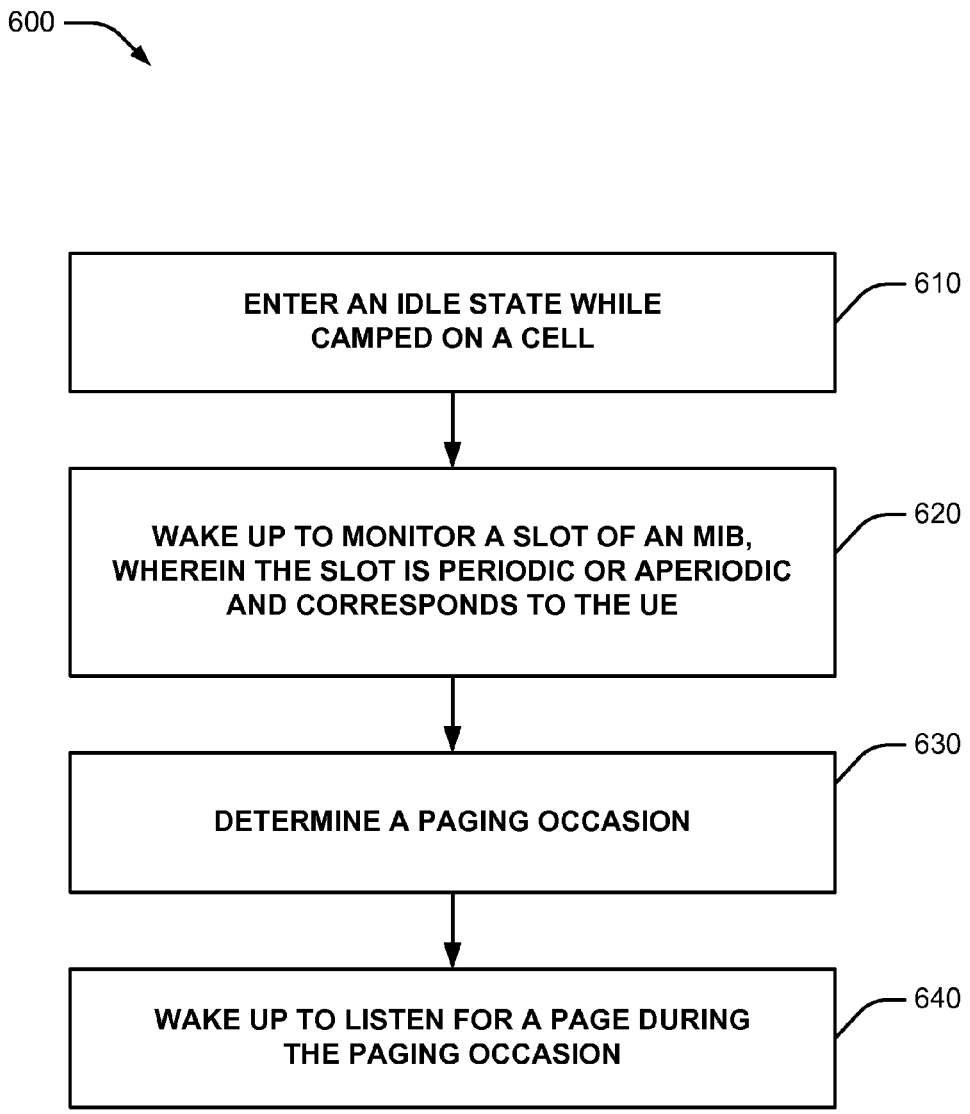
FIG. 6 is a flow chart of a method for receiving a page over unlicensed spectrum according to the second aspect, e.g., according to FIG. 1.

Referring to FIG. 6, aspects of a method 600 of receiving a page in a wireless communication system (e.g., page 140 (FIG. 1) from eNB 106 (FIG. 1)), according to the second aspect, may be performed by UE 102 (FIG. 1). More particularly, aspects of the method 400 may be performed by idle component 128 (FIG. 1), MIB wake up component 130 (FIG. 1), and/or paging wake up component 132 (FIG. 1).

In an aspect, at block 610, method 600 may enter an idle state while camped on a cell. For example, as described herein, UE 102 (FIG. 1) and/or idle component 128 (FIG. 1) may determine to enter an idle state while camped on a cell associated with eNB 106 (FIG. 1).

At block 620, method 600 may wake up to monitor a slot of a MIB, wherein the slot is periodic or aperiodic and corresponds to the UE. For example, as described herein, UE 102 (FIG. 1) and/or MIB wake up component 130 may wake up UE 102 (FIG. 1) to monitor the periodic or aperiodic slot within the MIB 134 (FIG. 1). In an aspect, the MIB slot may be previously configured and known to both UE 102 (FIG. 1) and eNB 106 (FIG. 1). The slot may be aperiodic such that, for example, rather than occurring every T milliseconds (ms), as in the case of periodic, the slot may move to less than once every T ms or more than once every T ms; however, on average, the slot still occurs every T ms.

At block 630, method 600 may determine a paging occasion. For example, as described herein, if a bit in the periodic or aperiodic slot is activated, UE 102 (FIG. 1) and/or MIB wake up component 130 (FIG. 1) may determine that the UE 102 (FIG. 1) should listen for a page 140 (FIG. 1) during a paging occasion k. The paging occasion k may be advertised to the UE 102 (FIG. 1) in MIB 134 (FIG. 1). The paging occasion k may be determined based on the equation k×T+x(k), where T is the average time in milliseconds (ms) when the slot occurs, and x(k) is a pseudo-random number that is known to both the UE 102 (FIG. 1) and network entities (e.g., eNB 106). UE 102 (FIG. 1) and/or MIB wake up component 130 (FIG. 1) may be configured to communicate this information (e.g., paging occasion k) to paging wake up component 132 (FIG. 1) as paging information 138 (FIG. 1).

At block 640, method 600 may wake up to listen for a page 140 (FIG. 1) during the paging occasion. For example, based on receiving the paging information 138 (FIG. 1), UE 102 (FIG. 1) and/or paging wake up component 132 (FIG. 1) may be configured to wake up UE 102 (FIG. 1) to listen for a page 140 (FIG. 1) during the paging occasion k.

Figure 7:
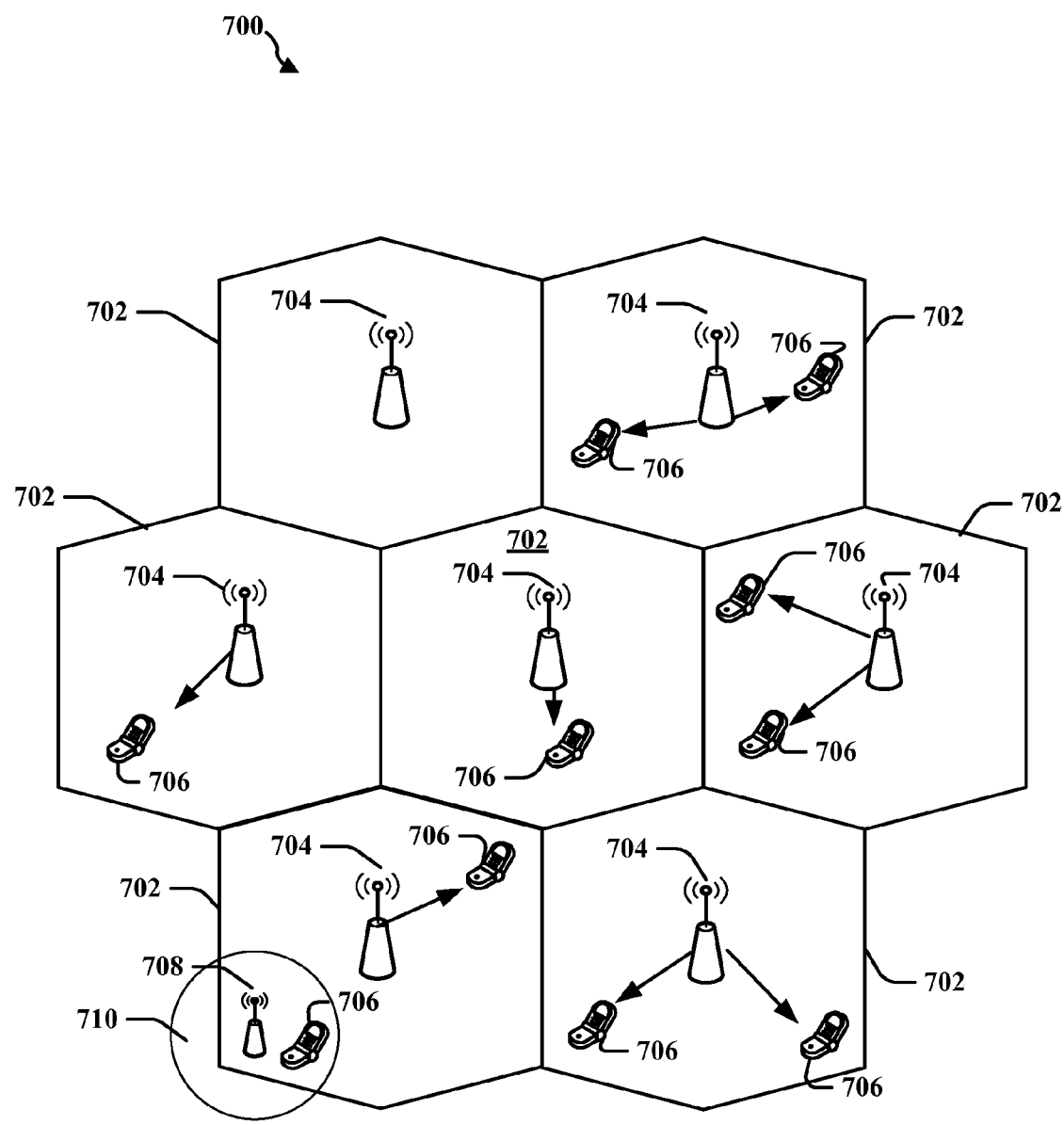
FIG. 7 is a diagram illustrating an example of an access network, including aspects configured to page a UE over unlicensed spectrum, e.g., according to FIG. 1.

FIG. 7 is a diagram illustrating an example of an access network 700 in an LTE network architecture, including aspects configured for receiving a page over unlicensed spectrum at a UE, and/or configured to page a UE over unlicensed spectrum. For instance, in an optional implementation for receiving a page in a wireless communication system, UEs 706 of FIG. 7 may be the same as or similar to UE 102 of FIG. 1, and/or may be or include apparatus 200 of FIG. 2 and/or may otherwise include idle component 128, MIB wake up component 130, and paging wake up component 132 as described in this disclosure. Further, for instance, in an optional implementation for paging a UE in a wireless communication system, the eNBs of FIG. 7 may be the same as or similar to eNB 106 of FIG. 1, and/or may be or include apparatus 200 of FIG. 2 and/or may otherwise include LTE-U paging component 126, as described in this disclosure.

In this example, the access network 700 is divided into a number of cellular regions (cells) 702. One or more lower power class eNBs 708, which may be eNB 106 or other eNBs 108 of FIG. 1, may have cellular regions 710 that overlap with one or more of the cells 702. The lower power class eNB 708 may be a femto cell (e.g., home eNB (HeNB)), pico cell, micro cell, or remote radio head (RRH). The macro eNBs 704, which may be eNB 106 and/or other eNBs 108 of FIG. 1, are each assigned to a respective cell 702 and are configured to provide an access point to the EPC 110 for all the UEs 706, which may be UE 102 of FIG. 1, in the cells 702. There is no centralized controller in this example of an access network 700, but a centralized controller may be used in alternative configurations. The eNBs 704 are responsible for all radio related functions including radio bearer control, admission control, mobility control, scheduling, security, and connectivity to the SGW 116.

The modulation and multiple access scheme employed by the access network 700 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 704 may have multiple antennas supporting MIMO technology. The use of MIMO technology enables the eNBs 704 to exploit the spatial domain to support spatial multiplexing, beamforming, and transmit diversity. Spatial multiplexing may be used to transmit different streams of data simultaneously on the same frequency. The data steams may be transmitted to a single UE 706 to increase the data rate or to multiple UEs 706, which may be the same as, or similar to, UE 102 of FIG. 1, to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 706 with different spatial signatures, which enables each of the UE(s) 706 to recover the one or more data streams destined for that UE 706. On the UL, each UE 706 transmits a spatially precoded data stream, which enables the eNB 704 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 8:
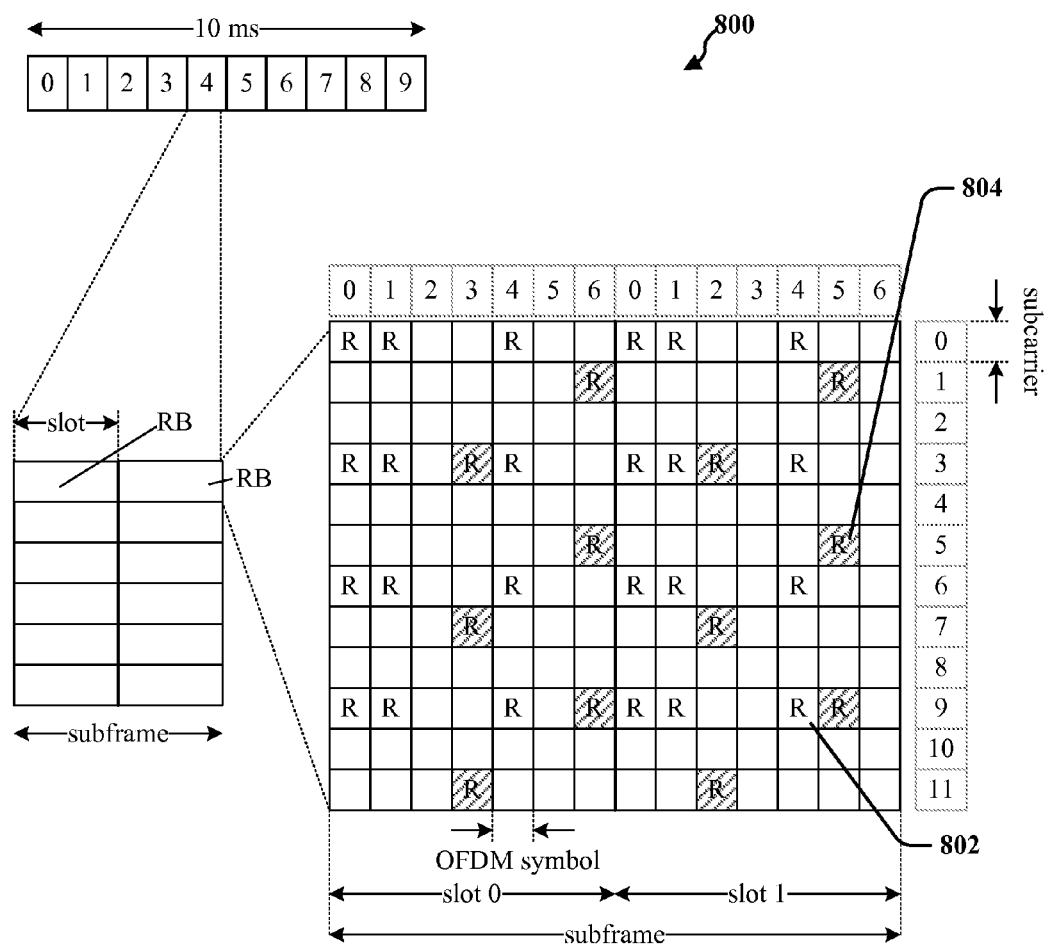
FIG. 8 is a diagram illustrating an example of a DL frame structure in LTE in accordance with an aspect of the present disclosure, e.g., according to FIG. 1.

FIG. 8 is a diagram 800 illustrating an example of a DL frame structure in LTE, which may be used when communicating data from eNB 106 (FIG. 1) to UE 102 (FIG. 1). A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 802, 804, include DL reference signals (DL-RS). The DL-RS include Cell-specific RS (CRS) (also sometimes called common RS) 802 and UE-specific RS (UE-RS) 804. UE-RS 804 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 9:
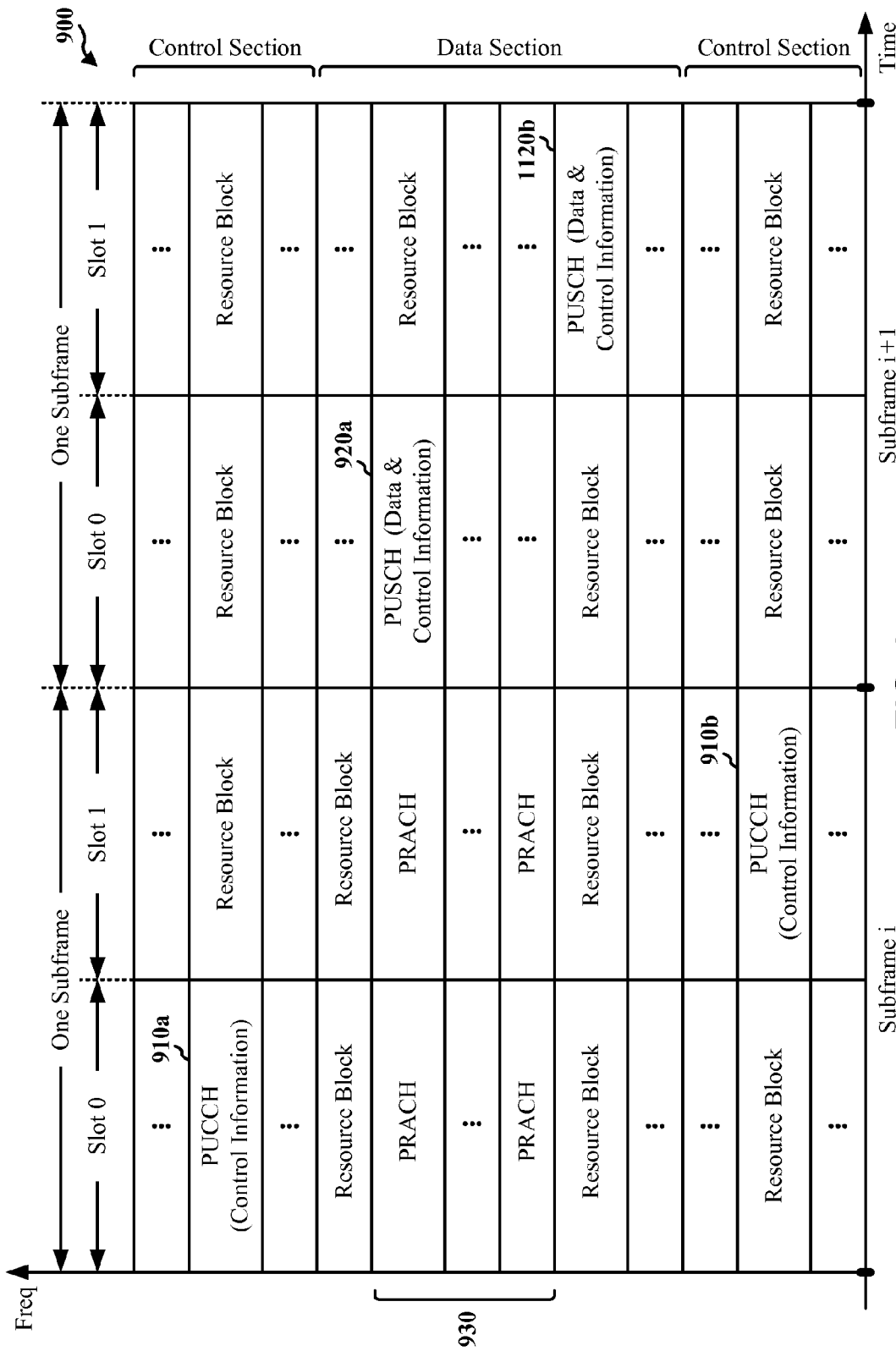
FIG. 9 is a diagram illustrating an example of an UL frame structure in LTE in accordance with an aspect of the present disclosure, e.g., according to FIG. 1.

FIG. 9 is a diagram 900 illustrating an example of an UL frame structure in LTE, which may be used when communicating from UE 102 (FIG. 1) to eNB 106 (FIG. 1). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 910*a*, 910*b* in the control section to transmit control information to an eNB. The UE may also be assigned resource blocks 920*a*, 920*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 930. The PRACH 930 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 10:
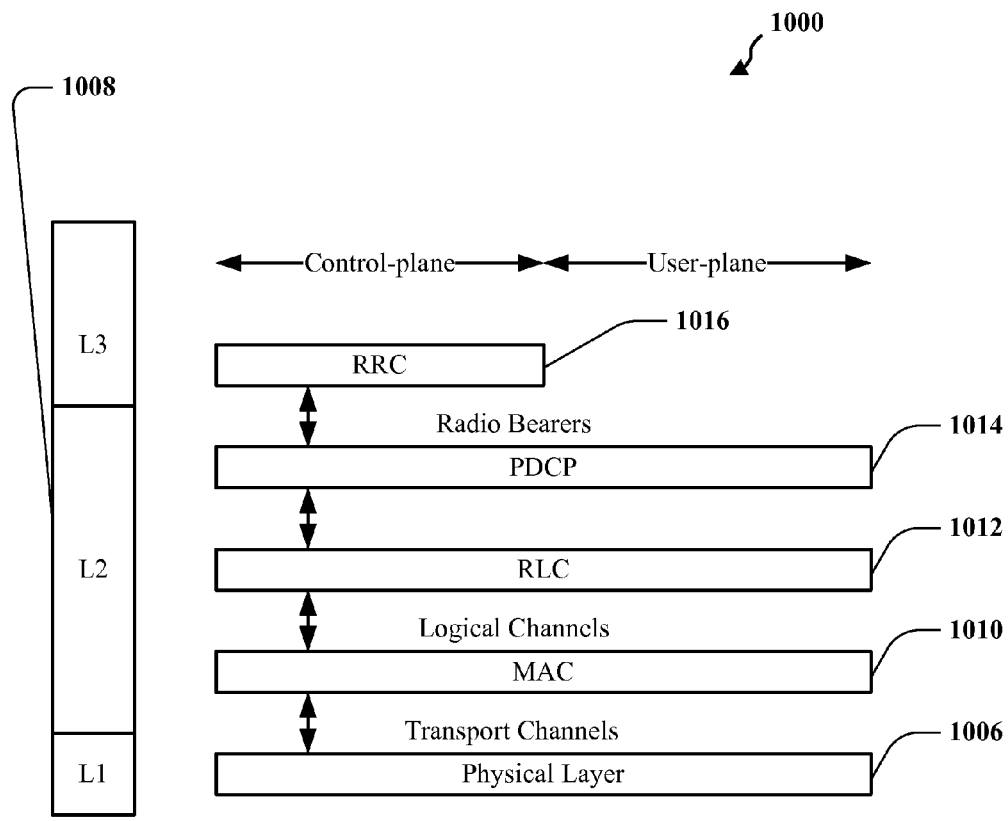
FIG. 10 is a diagram illustrating an example of a radio protocol architecture for user and control planes in accordance with an aspect of the present disclosure, e.g., according to FIG. 1.

FIG. 10 is a diagram 1000 illustrating an example of a radio protocol architecture for the user and control planes in LTE. The radio protocol architecture for a UE, such as, for example, UE 102 of FIG. 1, and an eNB, such as, for example, eNB 106 and/or other eNBs 108 of FIG. 1, is shown with three layers: Layer 1, Layer 2, and Layer 3. Layer 1 (L1 layer) is the lowest layer and implements various physical layer signal processing functions. The L1 layer will be referred to herein as the physical layer 1006.

Layer 2 (L2 layer) 1008 is above the physical layer 1006 and is responsible for the link between the UE and eNB over the physical layer 1006.

In the user plane, the L2 layer 1008 includes a media access control (MAC) sublayer 1010, a radio link control (RLC) sublayer 1012, and a packet data convergence protocol (PDCP) 1014 sublayer, which are terminated at the eNB on the network side. Although not shown, the UE may have several upper layers above the L2 layer 1008 including a network layer (e.g., IP layer) that is terminated at the PDN gateway 118 on the network side, and an application layer that is terminated at the other end of the connection (e.g., far end UE, server, etc.).

The PDCP sublayer 1014 provides multiplexing between different radio bearers and logical channels. The PDCP sublayer 1014 also provides header compression for upper layer data packets to reduce radio transmission overhead, security by ciphering the data packets, and handover support for UEs between eNBs. The RLC sublayer 1012 provides segmentation and reassembly of upper layer data packets, retransmission of lost data packets, and reordering of data packets to compensate for out-of-order reception due to hybrid automatic repeat request (HARQ). The MAC sublayer 1010 provides multiplexing between logical and transport channels. The MAC sublayer 1010 is also responsible for allocating the various radio resources (e.g., resource blocks) in one cell among the UEs. The MAC sublayer 1010 is also responsible for HARQ operations.

In the control plane, the radio protocol architecture for the UE and eNB is substantially the same for the physical layer 1006 and the L2 layer 1008 with the exception that there is no header compression function for the control plane. The control plane also includes a radio resource control (RRC) sublayer 1016 in Layer 3 (L3 layer). The RRC sublayer 1016 is responsible for obtaining radio resources (i.e., radio bearers) and for configuring the lower layers using RRC signaling between the eNB and the UE.

Figure 11:
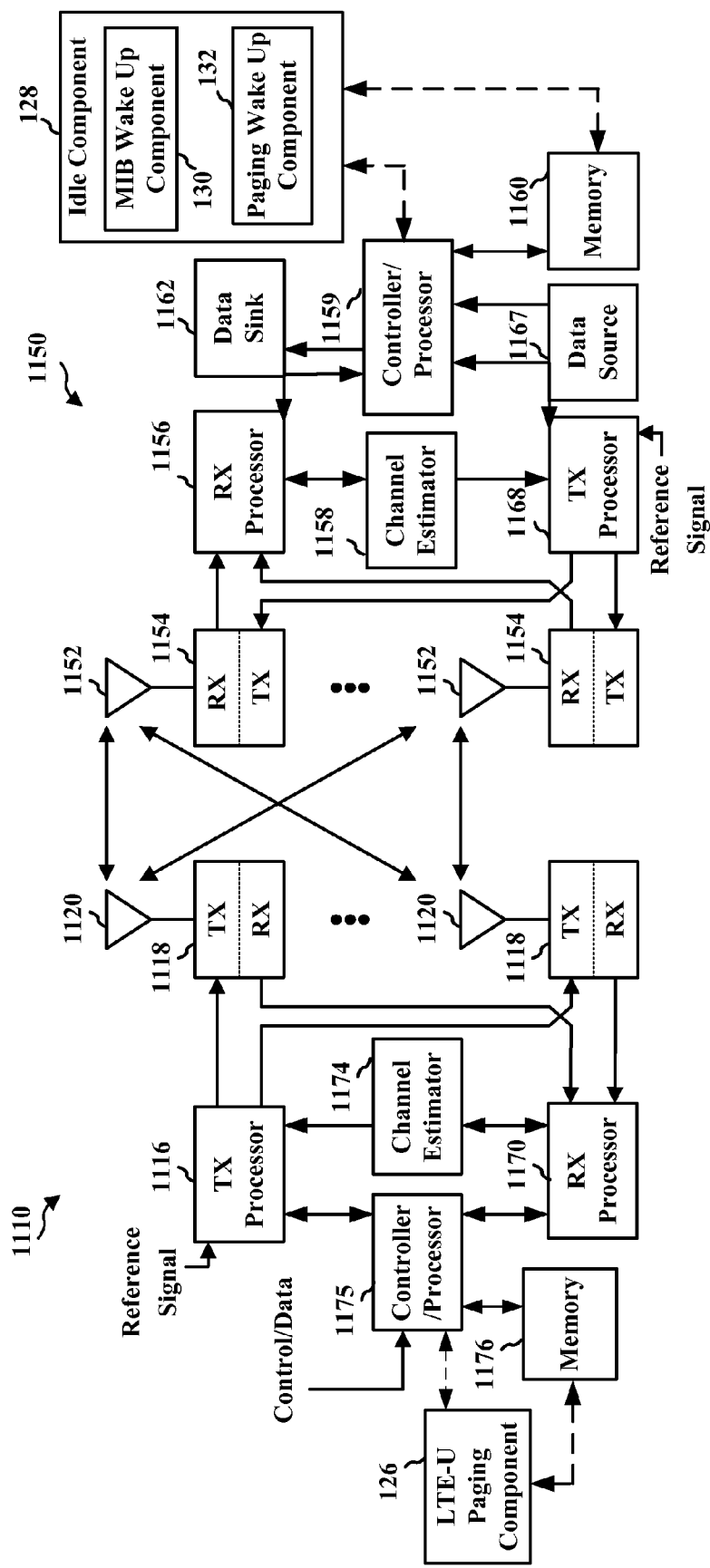
FIG. 11 is a diagram illustrating an example of an evolved Node B and user equipment in an access network, including aspects configured to page a user equipment over unlicensed spectrum, e.g., according to FIG. 1.

FIG. 11 is a block diagram of an eNB 1110 in communication with a UE 1150 in an access network, including aspects configured to send a page (e.g., page 140 of FIG. 1) to a UE (e.g., UE 102 of FIG. 1) over unlicensed spectrum, or to receive a page over unlicensed spectrum at the UE. In this example, eNB 1110 may be the same as, or similar to, eNB 106 (FIG. 1) and/or may include LTE-U paging component 126 (FIG. 1) in controller/processor 1175 and/or memory 1176, and UE 1150 may be the same as, or similar to, UE 102 and/or may include idle component 128 and/or MIB wake up component 130 (FIG. 1) and paging wake up component 132 (FIG. 1) in controller/processor 1159 and/or memory 1160.

In the DL, upper layer packets from the core network are provided to a controller/processor 1175. The controller/processor 1175 implements the functionality of the L2 layer. In the DL, the controller/processor 1175 provides header compression, ciphering, packet segmentation and reordering, multiplexing between logical and transport channels, and radio resource allocations to the UE 1150 based on various priority metrics. The controller/processor 1175 is also responsible for HARQ operations, retransmission of lost packets, and signaling to the UE 1150.

The transmit (TX) processor 1116 implements various signal processing functions for the L1 layer (i.e., physical layer). The signal processing functions includes coding and interleaving to facilitate forward error correction (FEC) at the UE 1150 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1174 may be used to determine the coding and modulation scheme, as well as for spatial processing. The channel estimate may be derived from a reference signal and/or channel condition feedback transmitted by the UE 1150. Each spatial stream is then provided to a different antenna 1120 via a separate transmitter 1118TX. Each transmitter 1118TX modulates an RF carrier with a respective spatial stream for transmission.

At the UE 1150, each receiver 1154RX receives a signal through its respective antenna 1152. Each receiver 1154RX recovers information modulated onto an RF carrier and provides the information to the receive (RX) processor 1156. The RX processor 1156 implements various signal processing functions of the L1 layer. The RX processor 1156 performs spatial processing on the information to recover any spatial streams destined for the UE 1150. If multiple spatial streams are destined for the UE 1150, they may be combined by the RX processor 1156 into a single OFDM symbol stream. The RX processor 1156 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 1110. These soft decisions may be based on channel estimates computed by the channel estimator 1158. The soft decisions are then decoded and deinterleaved to recover the data and control signals that were originally transmitted by the eNB 1110 on the physical channel. The data and control signals are then provided to the controller/processor 1159.

The controller/processor 1159 implements the L2 layer. The controller/processor can be associated with a memory 1160 that stores program codes and data. The memory 1160 may be referred to as a computer-readable medium. In the UL, the controller/processor 1159 provides demultiplexing between transport and logical channels, packet reassembly, deciphering, header decompression, control signal processing to recover upper layer packets from the core network. The upper layer packets are then provided to a data sink 1162, which represents all the protocol layers above the L2 layer. Various control signals may also be provided to the data sink 1162 for L3 processing. The controller/processor 1159 is also responsible for error detection using an acknowledgement (ACK) and/or negative acknowledgement (NACK) protocol to support HARQ operations.

In the UL, a data source 1167 is used to provide upper layer packets to the controller/processor 1159. The data source 1167 represents all protocol layers above the L2 layer. Similar to the functionality described in connection with the DL transmission by the eNB 1110, the controller/processor 1159 implements the L2 layer for the user plane and the control plane by providing header compression, ciphering, packet segmentation and reordering, and multiplexing between logical and transport channels based on radio resource allocations by the eNB 1110. The controller/ processor 1159 is also responsible for HARQ operations, retransmission of lost packets, and signaling to the eNB 1110.

Channel estimates derived by a channel estimator 1158 from a reference signal or feedback transmitted by the eNB 1110 may be used by the TX processor 1168 to select the appropriate coding and modulation schemes, and to facilitate spatial processing. The spatial streams generated by the TX processor 1168 are provided to different antenna 1152 via separate transmitters 1154TX. Each transmitter 1154TX modulates an RF carrier with a respective spatial stream for transmission.

The UL transmission is processed at the eNB 1110 in a manner similar to that described in connection with the receiver function at the UE 1150. Each receiver 1118RX receives a signal through its respective antenna 1120. Each receiver 1118RX recovers information modulated onto an RF carrier and provides the information to a RX processor 1170. The RX processor 1170 may implement the L1 layer.

The controller/processor 1175 implements the L2 layer. The controller/processor 1175 can be associated with a memory 1176 that stores program codes and data. The memory 1176 may be referred to as a computer-readable medium. In the UL, the control/processor 1175 provides demultiplexing between transport and logical channels, packet reassembly, deciphering, header decompression, control signal processing to recover upper layer packets from the UE 1150. Upper layer packets from the controller/processor 1175 may be provided to the core network. The controller/processor 1175 is also responsible for error detection using an ACK and/or NACK protocol to support HARQ operations.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be non-transitory, and which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or examples, it should be noted that various changes and modifications could be made herein without departing from the scope of the described aspects and/or examples as defined by the appended claims. Furthermore, although elements of the described aspects and/or examples may be described or claimed in the singular, the plural is contemplated unless limitation to the singular is explicitly stated. Additionally, all or a portion of any aspect and/or examples may be utilized with all or a portion of any other aspect and/or examples, unless stated otherwise.

What is claimed is:

1. A method of receiving a page at a user equipment in a wireless communication system, comprising:
   entering an idle state while camped on a cell;
   waking up from the idle state to monitor a slot of a master information block (MIB) for a paging indication, wherein the slot is dynamically selected and corresponds to a short identity associated with the user equipment relative to a longer global user equipment identity;
   recognizing the paging indication in the monitored slot of the MIB;
   determining a paging window based on correlation information in a system information block (SIB); and
   waking up to listen for a page during the paging window.

2. The method of claim 1, wherein the slot is selected based on the short identity.

3. The method of claim 1, wherein the SIB includes a correlation between the short identity and the paging window.

4. The method of claim 1, wherein recognizing the paging indication includes determining that a bit within the slot is activated.

5. The method of claim 1, wherein the slot can differ over time and is not previously-known to the user equipment and other network entities in communication with the user equipment.

6. A non-transitory computer readable medium storing computer executable code for receiving a page at a user equipment in a wireless communication system, comprising:
   code executable to enter an idle state while camped on a cell;
   code executable to wake up from the idle state to monitor a slot of a master information block (MIB) for a paging indication, wherein the slot is dynamically selected and corresponds to a short identity associated with the user equipment relative to a longer global user equipment identity;
   code executable to recognize the paging indication in the monitored slot;
   code executable to determine a paging window based on correlation information in a system information block (SIB); and
   code executable to wake up to listen for a page during the paging window.

7. An apparatus for receiving a page in a wireless communication system, comprising:
   means for determining to enter an idle state while camped on a cell;
   means for waking up from the idle state to monitor a slot of a master information block (MIB) for a paging indication, wherein the slot is dynamically selected and corresponds to a short identity associated with a user equipment relative to a longer global user equipment identity;
   means for recognizing a paging indication in the monitored slot;
   means for determining a paging window based on correlation information in a system information block (SIB); and
   means for waking up to listen for a page during the paging window.

8. An apparatus for receiving a page in a wireless communication system, comprising:
   an MIB wake up component configured to:
      determine to enter an idle state while camped on a cell,
      wake up from the idle state to monitor a slot of a master information block (MIB) for a paging indication, wherein the slot is dynamically selected and corresponds to a short identity associated with a user equipment relative to a longer global user equipment identity, and
      recognize a paging indication in the monitored slot; and
   a paging wake up component configured to determine a paging window based on correlation information in a system information block (SIB), and
wake up to listen for a page during the paging window.

9. The apparatus of claim 8, wherein the slot is selected based on the short identity.

10. The apparatus of claim 8, wherein the SIB includes a correlation between the short identity and the paging window.

11. The apparatus of claim 8, wherein to recognize the paging indication, the MIB wake up component is further configured to determine that a bit within the slot is activated.

12. The apparatus of claim 8, wherein the slot can differ over time and is not previously-known to the user equipment and other network entities in communication with the user equipment.

13. A method of receiving a page at a user equipment in a wireless communication system, comprising:
    entering an idle state while camped on a cell;
    waking up to monitor a slot of a master information block (MIB), wherein the slot is aperiodic, the aperiodic occurrence results in the slot having an average period that is a positive, numerical value and corresponds to the user equipment, and wherein the aperiodic slot is previously configured and known to the user equipment and network entities in communication with the user equipment;
    determining a paging occasion, wherein determining the paging occasion comprises determining a time of a paging occasion, k, which is based on k multiplied by the average period plus a pseudo random number known to the user equipment and network entities in communication with the user equipment; and
    waking up to listen for a page during the paging occasion.

14. An apparatus for receiving a page in a wireless communication system, comprising:
    an MIB wake up component configured to:
       determine to enter an idle state while camped on a cell, and
       wake up to monitor a slot of a master information block (MIB), wherein the slot is aperiodic, the aperiodic occurrence of the slot results in the slot having an average period that is a positive, numerical value, and corresponds to a user equipment, and wherein the aperiodic slot is previously configured and known to a user equipment and network entities in communication with the user equipment; and
    a paging wake up component configured to:
       determine a paging occasion, and wherein to determine the paging occasion, the paging wake up component is further configured to determine a time of a paging occasion, k, which is based on k multiplied by the average period plus a pseudo random number known to the user equipment and network entities in communication with the user equipment; and
       wake up to listen for a page during the paging occasion.

* * * * *